No. 842,637. PATENTED JAN. 29, 1907.
C. A. DUNHAM.
AUTOMATIC VALVE.
APPLICATION FILED JAN. 4, 1906.

WITNESSES:
Edward Thorpe.
Isaac B. Owens.

INVENTOR
Clayton A. Dunham
BY
Munn & Co
ATTORNEYS

UNITED STATES PATENT OFFICE.

CLAYTON AUBRA DUNHAM, OF MARSHALLTOWN, IOWA.

AUTOMATIC VALVE.

No. 842,637.　　　　Specification of Letters Patent.　　　　Patented Jan. 29, 1907.

Application filed January 4, 1906. Serial No. 294,544.

*To all whom it may concern:*

Be it known that I, CLAYTON AUBRA DUNHAM, a citizen of the United States, and a resident of Marshalltown, in the county of Marshall and State of Iowa, have invented a new and Improved Automatic Valve, of which the following is a full, clear, and exact description.

The invention relates to a valve arranged to automatically close in the presence of heat. It is useful in many connections, particularly as applied to the return ends of radiators in vacuum heating systems. The valve permits the air and water of condensation to flow freely from the radiator; but as steam begins to flow from the valve it will be closed and the movement of the steam arrested.

The invention resides in certain special features of construction and relative arrangement of parts, which will be fully set forth hereinafter and particularly pointed out in the claims.

Reference is to be had to the accompanying drawings, which illustrate, as an example, the preferred embodiment of my invention, in which drawings—

Figure 1:
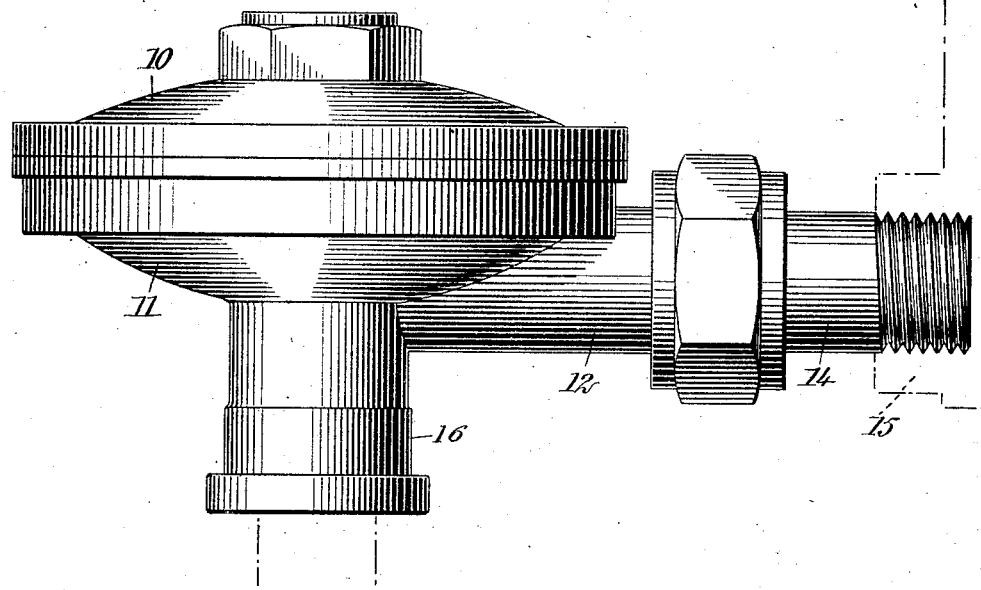
Figure 2:
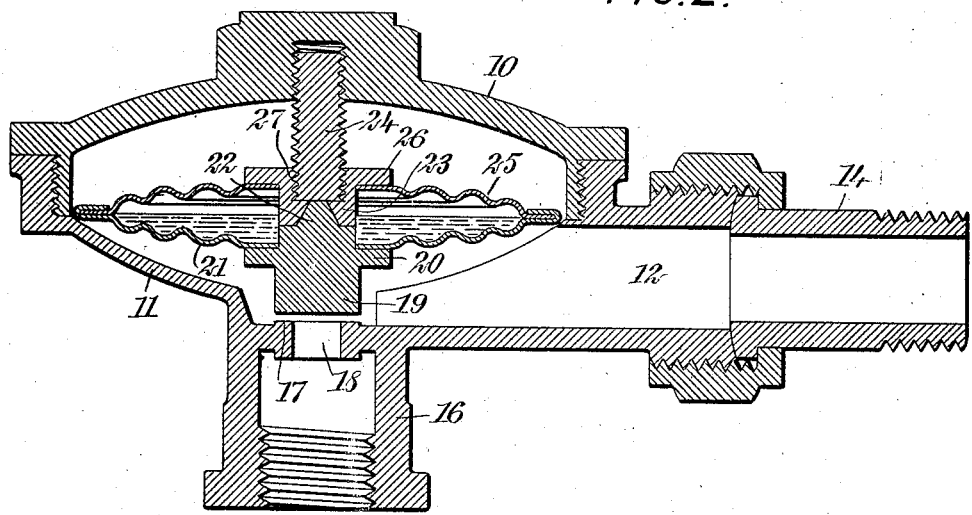

Figure 1 is an enlarged side view of the valve, and Fig. 2 is an enlarged section of the same.

The valve, as here shown, has a circular casing of double convex form and composed of an upper section 10 and a lower section 11, screwed together, as shown. Projecting from the lower section 11 is an inlet-nipple 12. As here shown, this nipple is connected with a thimble 14, which in turn communicates with the return of the radiator, which is indicated by the broken lines 15 in Fig. 1. From the center of the lower section 11 an outlet-nipple 16 passes, and at the upper end thereof is arranged a flat valve-seat 17, surrounding the discharge-orifice 18.

19 indicates the valve proper, which has a flat face arranged to bear on the seat 17, thus sealing the orifice 18 and preventing fluid movement through the valve. The valve proper, 19, has a flange 20, which is fastened by soldering or otherwise to a circular corrugated plate 21, of copper or other suitable material. The valve 19 has its inner end extending through an opening in said plate 21 and formed with a tapering plug 22. The tapered plug 22 coacts with a correspondingly-orificed block 23, which is fitted in a central opening in a plate 25, similar to the plate 21. The block 23 has a flange 26, which is soldered to the plate, thus securing the block in place. Said block 23 has an opening 27 extending through it to meet the cavity of the block, and this opening is normally plugged by a pin 24, which is screwed therein, as shown. This pin serves not only to seal the opening 27, but is screwed in the upper section 10 of the case of the valve, so as to sustain the valve proper with its operating parts. The two plates 21 and 25 are opposite each other, and their edges are hermetically connected together, so that the plates form a circular chamber, and owing to the flexibility of the plates this chamber may be expanded or contracted to move the valve 19 toward and from the seat 17. The chamber thus formed is adapted to be partly filled with a highly-volatile liquid, so that as the chamber is heated the liquid will vaporize and expand, expanding the walls of the chamber and seating the valve.

In the construction of the device the plates 21 and 25 are joined together and the parts 19 and 23 secured in place, said parts engaging each other to limit the inward movement of the plates. The liquid which is placed in the expanded chamber is then introduced through the orifice 27, and finally the pin 24 is inserted and secured, if desired, by solder, so as to form an entirely hermetic connection. This pin is then screwed into the top section 10 of the case, and by adjusting the position of the pin the distance of the movement of the valve 19 to its seat may be regulated.

In the use of the invention the valve is arranged to be normally open, and, assuming that it is used in connection with vacuum heating systems, as the vacuum-pump begins to operate air and water will be drawn out of the radiator and will pass freely through the opening 18. As steam begins to enter the radiators, however, and reaches the valve-casing it will raise the temperature therein, vaporizing the liquid in the expansion-chamber and causing the valve 19 to be engaged firmly with its seat, thus closing the opening 18 and preventing the escape of the steam. The valve is useful in various other connections, as will, it is thought, be apparent.

By providing the stud 22 and cavity in 23, which match as explained, I insure properly positioning the two disks 21 and 25 during the time that they are being clenched or otherwise fastened together at their edges.

Having thus described the preferred form of my invention, what I claim as new, and desire to secure by Letters Patent, is—

1. A valve comprising a casing with inlet and outlet openings and a seat, a valve proper coacting with the seat, an expansion-chamber to one wall of which the valve proper is connected, a member connected to the opposite wall of the expansion-chamber, said member and valve being extended into the expansion-chamber to engage each other and limit the movement of the walls of the chamber toward each other, and means for adjustably attaching the expansion-chamber to the casing.

2. A valve comprising a casing, with inlet and outlet openings and a valve-seat, a valve proper coacting with the seat, an expansion-chamber through one wall of which a part of the valve is extended, said part terminating in a tapered plug, a member secured to the opposite wall of the expansion-chamber and having a tapered orifice adapted to receive the plug, and means engaged with said member for attaching the expansion-chamber to the casing.

3. A valve comprising a casing with inlet and outlet orifices and a valve-seat, a valve proper coacting therewith, an expansion-chamber to which the valve proper is attached, a member permanently secured in the wall of the expansion-chamber opposite the valve proper and having a filling-opening therein, and a plug secured in said opening and adjustably connected to the inner side of the casing, for the double purpose specified.

4. A valve comprising a casing with inlet and outlet orifices and a valve-seat, a valve proper coacting therewith, an expansion-chamber to which the valve proper is attached, a member secured in the wall of the expansion-chamber opposite the valve proper and having a filling-opening therein, and a plug secured in said opening and adjustably connected to the casing, for the double purpose specified, the inner end of the valve and the said member being adapted to engage each other within the expansion-chamber to limit the contraction of said chamber.

5. A valve having a casing with inlet and outlet openings and a valve-seat, a valve proper coacting with the seat, an expansion-chamber to which the valve proper is attached, a member secured to the wall of the expansion-chamber opposite the valve proper and having a filling-opening therein, and a plug secured in said opening, for the purpose specified.

6. A valve having a casing with inlet and outlet openings and a valve-seat, a valve proper coacting with the seat, an expansion-chamber to which the valve proper is attached, a member secured to the wall of the expansion-chamber opposite the valve proper and having a filling-opening therein, and a plug secured in said opening, for the purpose specified, the valve and said member having portions extended into the expansion-chamber and adapted to engage each other to limit the contracting movement of the chamber.

7. In a valve, the combination of a casing having inlet and outlet openings and a valve-seat, a valve coacting with the seat and controlling fluid movement through the casing, an expansion-chamber located within the casing and to one side of which the valve is attached, a plug within the expansion-chamber and projecting from the side to which the valve is attached, an orificed block fastened to the other side of the expansion-chamber and coacting with the said plug, and a member screwed in the orifice in the block and connected with the casing to attach the expansion-chamber to the same.

In testimony whereof I have signed my name to this specification in the presence of two subscribing witnesses.

CLAYTON AUBRA DUNHAM.

Witnesses:
  E. T. FLANAGAN,
  SAM ORONEROD.